United States Patent [19]
Rosenfeld et al.

[11] Patent Number: 5,999,910
[45] Date of Patent: Dec. 7, 1999

[54] PROCESSING A WORKFLOW ITEM

[75] Inventors: Kurt A. Rosenfeld, Medfield, Mass.; Kenneth U. Gibson, West Jordan; Robert C. Bisantz, Sandy, both of Utah

[73] Assignee: FMR Corp., Boston, Mass.

[21] Appl. No.: 08/944,805

[22] Filed: Oct. 6, 1997

[51] Int. Cl.⁶ .................................................. G07C 3/00
[52] U.S. Cl. ............................... 705/7; 705/38; 395/232; 345/326
[58] Field of Search .................... 705/38, 7; 395/200.32; 345/326

[56] References Cited

U.S. PATENT DOCUMENTS

| | | | |
|---|---|---|---|
| 5,168,444 | 12/1992 | Cukor et al. | 364/401 |
| 5,182,705 | 1/1993 | Barr et al. | 364/401 |
| 5,191,522 | 3/1993 | Bosco et al. | 364/401 |
| 5,191,525 | 3/1993 | LeBrun et al. | 364/419 |
| 5,208,748 | 5/1993 | Flores et al. | 364/419 |
| 5,446,740 | 8/1995 | Yien et al. | 370/110.1 |
| 5,826,020 | 10/1998 | Randell | 395/200.32 |

OTHER PUBLICATIONS

Workflow Management Coalition "Workflow Management Coalition Terminology & Glossary" Jun. 1996 Issue 2.0 pp. 1–59.

*Primary Examiner*—Thomas R. Peeso
*Attorney, Agent, or Firm*—Fish & Richardson P.C.

[57] ABSTRACT

A computer-based method is provided for use in processing a work item in an automated workflow system. Suspension information relating to a previous suspension of the work item is stored. Based on the suspension information or the indication of the current time, it is determined whether processing of the work item is permitted to be suspended. A recommended resume time is determined that constitutes a time that is permitted to be selected for when processing of the work item is to resume, and the recommended resume time is displayed to an operator before the operator causes processing of the work item to be suspended. After processing of the work item has been suspended, it is determined that processing of the work item is to be resumed, and the work item is caused to be one of a predetermined number of next work items presented to an operator after the determination is made.

47 Claims, 16 Drawing Sheets

| | DATABASE of WORK ITEMS | | | | | |
|---|---|---|---|---|---|---|
| ID | Type | Data | Status | Mark | Susp. Qty | Total Susp. Time |
| 123 | 28 | | 3 | | | |
| 124 | 32 | | 6 | | | |
| 125 | 28 | | 2 | | | |
| 126 | 29 | | 5 | | | |
| 127 | 30 | | 1 | | | |

| Rules Table (28) |||
|---|---|---|
| ID | If | Then |
| 1234 | Total Suspension Count = 10 | Refuse to Suspend |
|  |  |  |
|  |  |  |
| ⋮ |||

FIG. 7

WORK HISTORY /36

SUSPENSION START TIME: TUES 1/2/1996 10:08
STATUS: BEING CREATED
OPERATOR: J. MAJOR
REASON: AWAITING ACCOUNT NUMBER
SUSPENSION END TIME: WED 1/3/1996 15:12

SUSPENSION START TIME: TUES 1/9/1996 09:05
STATUS: BEING APPROVED
OPERATOR: J. SMITH
REASON: AWAITING CHECK
SUSPENSION END TIME: WED 1/10/1996 11:15

SUSPENSION START TIME: TUES 1/10/1996 11:23
STATUS: BEING APPROVED
OPERATOR: J. SMITH
REASON: AWAITING CHECK
SUSPENSION END TIME: THURS 1/11/1996 13:30

SUSPENSION START TIME: TUES 1/11/1996 13:42
STATUS: BEING APPROVED
OPERATOR: J. SMITH
REASON: AWAITING CHECK
SUSPENSION END TIME: FRI 1/12/1996 15:45

SUSPENSION START TIME: TUES 1/16/1996 13:42
STATUS: BEING REPORTED
OPERATOR: J. DOE
REASON: AWAITING BROCHURE
SUSPENSION END TIME: WED 1/18/1996 12:15

FIG. 8

| Business Hours Schedule | | | | | | | |
|---|---|---|---|---|---|---|---|
| | Sun | Mon | Tues | Wed | Thurs | Fri | Sat |
| 12 | | | | | | | |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |
| 12 | | | | | | | |
| 1 | | | | | | | |
| 2 | | | | | | | |
| 3 | | | | | | | |
| 4 | | | | | | | |
| 5 | | | | | | | |
| 6 | | | | | | | |
| 7 | | | | | | | |
| 8 | | | | | | | |
| 9 | | | | | | | |
| 10 | | | | | | | |
| 11 | | | | | | | |

FIG.10

Table of Suspension Entries — 48

| Work Item ID | Operator | Resume Time | Resume Destination |
|---|---|---|---|
| 123 | OP2 | 01/22/96 12:45 PM | OP2 |
| | | | |
| | | | |
| | | | |
| | | | |
| | | | |
| ⋮ | | | |

50 { (first data row)

FIG.12

Operator Table — 52

| Oper ID | Name |
|---|---|
| OP1 | J. Doe |
| OP2 | J. Smith |
| OP3 | J. Jones |
| OP4 | J. Major |
| ⋮ | |

FIG.13

PROCESSING A WORKFLOW ITEM

BACKGROUND OF THE INVENTION

The invention relates to processing a workflow work item.

Members of an organization are provided with work items (representing tasks such as filling out documents, returning telephone calls to potential or existing customers, or initiating transactions) for execution from a database of unexecuted work items. For efficiency, a workflow management system is provided to automate distribution of the work items to the members, each of whom is situated at a computer station (such as a personal computer) connected to a computer system running a workflow application program. Typically, a member is permitted to cause a fixed delay in (i.e., to suspend) the processing of an assigned work item. After such a suspension, or after the assigned work item is executed at the computer station, a new work item is provided from the database in response to a request from the computer station.

SUMMARY OF THE INVENTION

In general, in one aspect, the invention features a computer-based method for use in processing a work item in an automated workflow system. According to the method, suspension information relating to a previous suspension of the work item is stored, and based on the suspension information, it is determined whether processing of the work item is permitted to be suspended.

Implementations of the invention may include one or more of the following features. The determination may be based on a limit specified by a rule. Based on the suspension information or a business hours schedule or both, a total number of times or a total amount of time processing of the work item has been suspended may be determined, and a number of times or an amount of time processing of the work item has been suspended as a result of an operator may be determined.

In general, in another aspect, the invention features a computer-based method for use in processing a work item in an automated workflow system. According to the method, an indication of the current time is provided, and based on the indication of the current time, it is determined whether processing of the work item is permitted to be suspended.

Implementations of the invention may include one or more of the following features. A time schedule may be stored, and the determination may be based on the time schedule.

In general, in another aspect, the invention features a computer-based method for use in processing a work item in an automated workflow system. According to the method, after processing of the work item has been suspended, it is determined that processing of the work item is to be resumed, and the work item is caused to be one of a predetermined number of next work items (e.g., the first work item) presented to an operator after the determination is made.

In general, in another aspect, the invention features a computer-based method for use in processing a work item in an automated workflow system. According to the method, a recommended resume time is determined that constitutes a time that is permitted to be selected for when processing of the work item is to resume, and the recommended resume time is displayed to an operator before the operator causes processing of the work item to be suspended.

Implementations of the invention may include one or more of the following features. A maximum suspension time value may be determined, to represent a maximum length of time for which processing of the work item is permitted to be suspended, and the determination of the recommended resume time may be based on the maximum suspension time value. A business hours schedule may be stored for processing of the work item, and the determination of the recommended resume time may be based on the business hours schedule for processing of the work item.

In general, in another aspect, the invention features a computer-based method for use in processing a work item in an automated workflow system. According to the method, after processing of the work item has been suspended, it is determined whether an operator is authorized to cause processing of the work item to resume, and depending on the outcome of the determination, the operator is allowed to cause processing of the work item to be resumed.

Implementations of the invention may include one or more of the following features. A suspended work items list may be stored, the suspended work items list including a suspended work item entry for each work item for which processing has been suspended, and a display list of suspended work items may be displayed to the operator, the display list including a selectable display entry for only each work item for which the operator is authorized to cause processing to resume.

In general, in another aspect, the invention features a computer-based method for use in processing a work item in an automated workflow system. According to the method, information is stored about a suspension of processing of the work item, and, based on the information about the suspension, a statistic is derived about suspension of processing of work items in the automated workflow system.

Implementations of the invention may include one or more of the following features. The work item may be processed in accordance with a predetermined sequence of phases, and the statistic may represent a frequency with which suspension of processing of work items occurs in connection with one of the phases in the sequence. The statistic may represent a frequency with which suspension of processing occurs for work items of a particular type, or with which suspension of processing of work items occurs in connection with a particular operator.

Among the advantages of the invention are one or more of the following. Suspension of processing of a work item can be made subject to one or more limits, to provide operators with an incentive to ration and prioritize the use of suspension, which improves the efficiency of processing of the work items. Suspension can be prevented from occurring at an undesirable time (e.g., when receipt is expected of an item or information that would make suspension unnecessary). An extra delay can be avoided, the extra delay resulting from the operator having to make multiple trial-and-error attempts to specify a permissible resume time. Unauthorized resumption can be prevented. Arrangements can be made so that after processing has already been delayed by suspension, processing is not additionally (and perhaps unpredictably) delayed as a result of an undetermined number of work items already awaiting presentation to the operator. Processing bottleneck problems (e.g., missing checks in new account applications) can be exposed.

BRIEF DESCRIPTION OF THE DRAWINGS

FIGS. 3, 5, 7, 11–13 are block diagrams of data structures used in the procedure of FIGS. 2A–2E.

FIG. 8 is a listing of a work history related to the procedure of FIGS. 2A–2E.

FIGS. 9–10 are block diagrams helpful for understanding the procedure of FIGS. 2A–2E.

DESCRIPTION OF THE PREFERRED EMBODIMENTS

Figure 1:
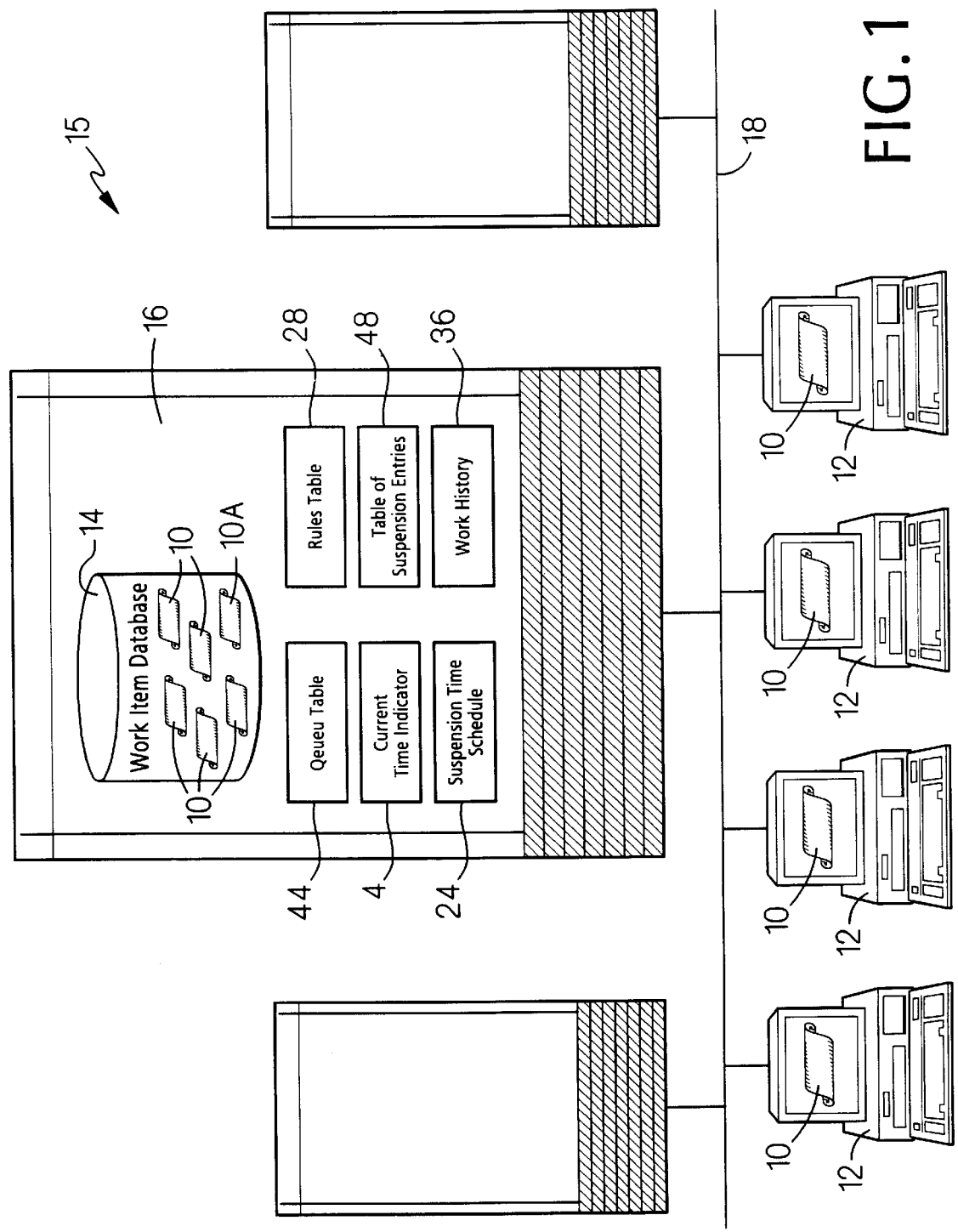
FIG. 1 is a block diagram of an automated workflow system.
Figure 2A:
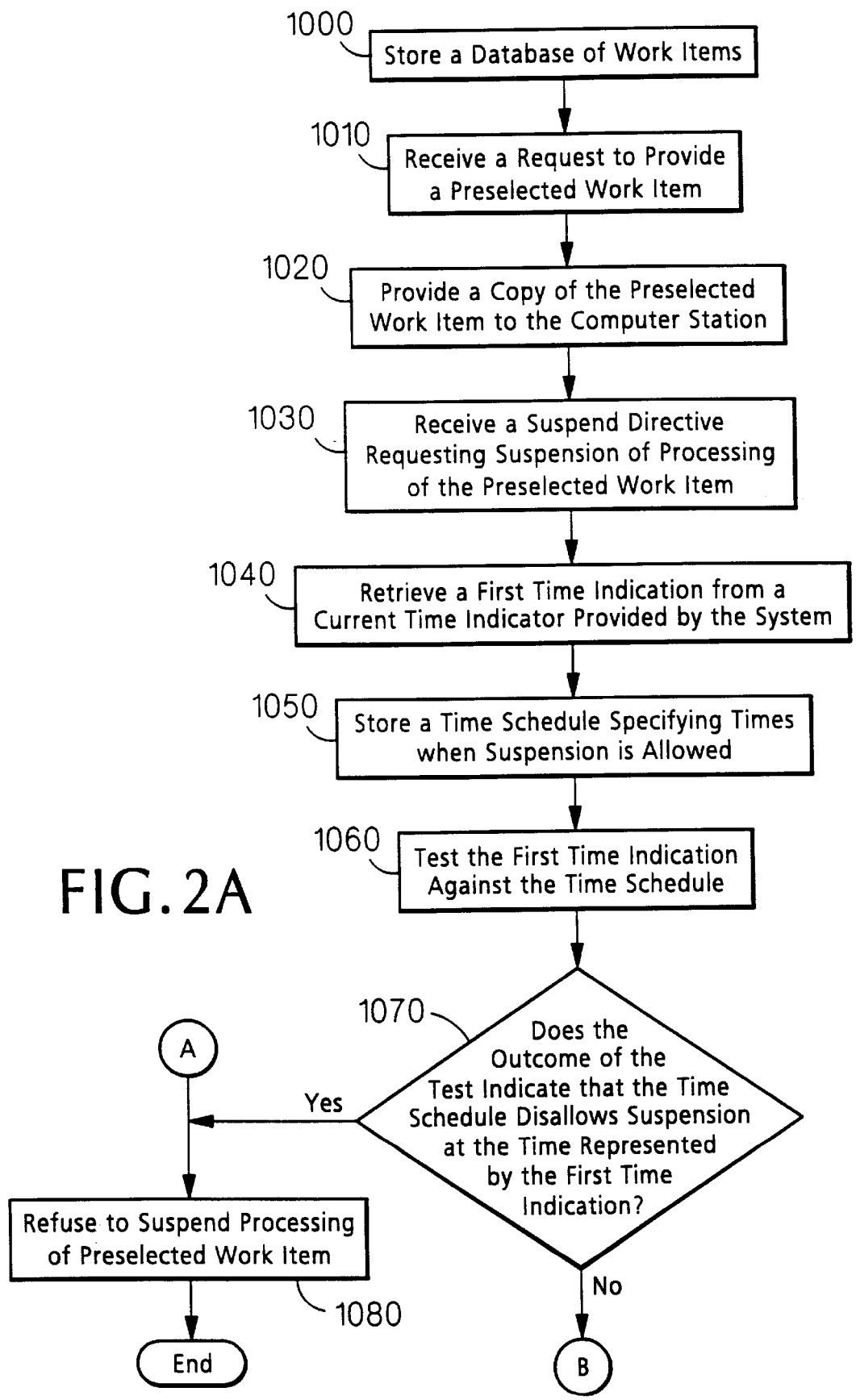
FIGS. 2A–2E are flow diagrams of a procedure executed by the automated workflow system.
Figure 2B:
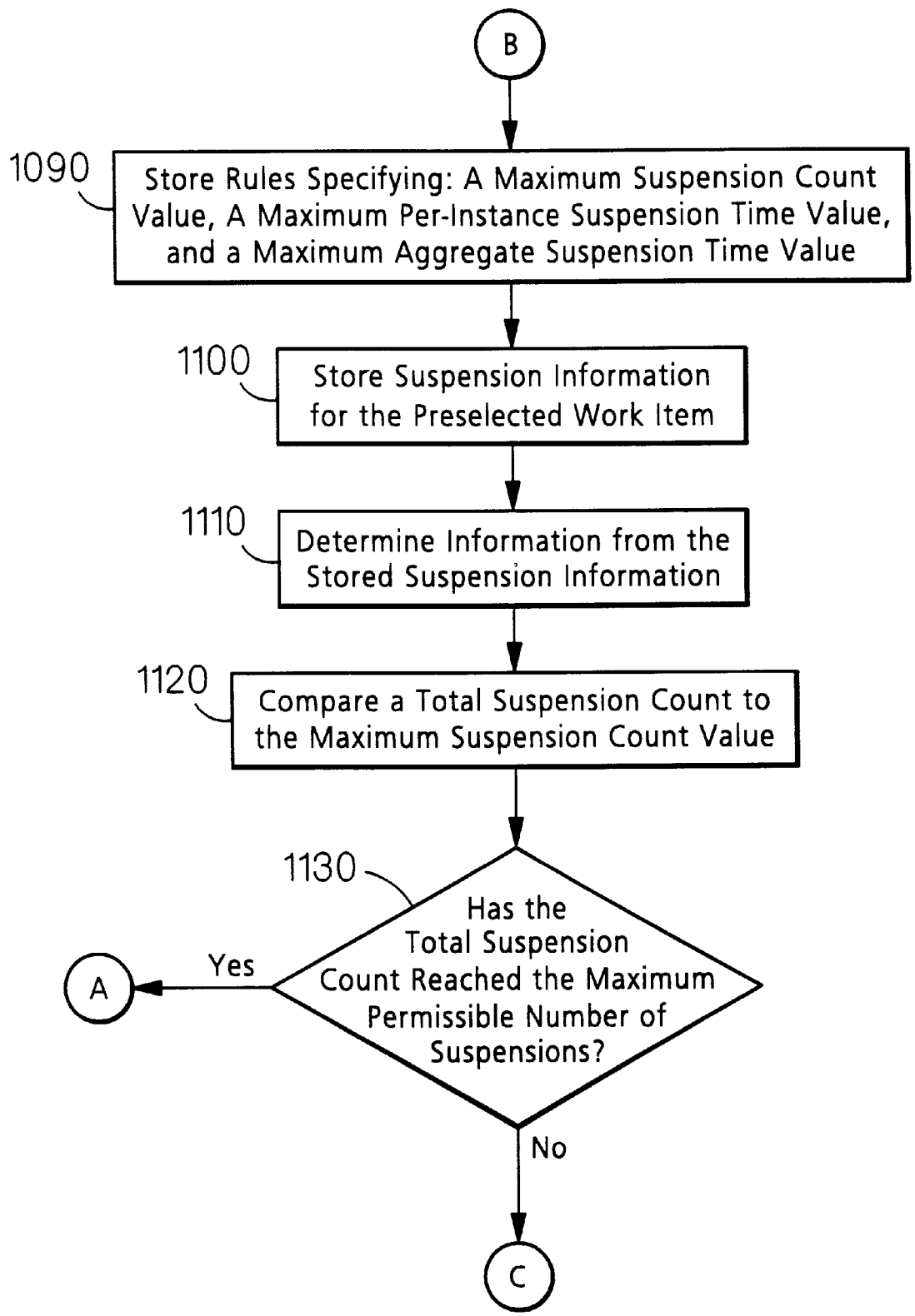
Figure 2C:
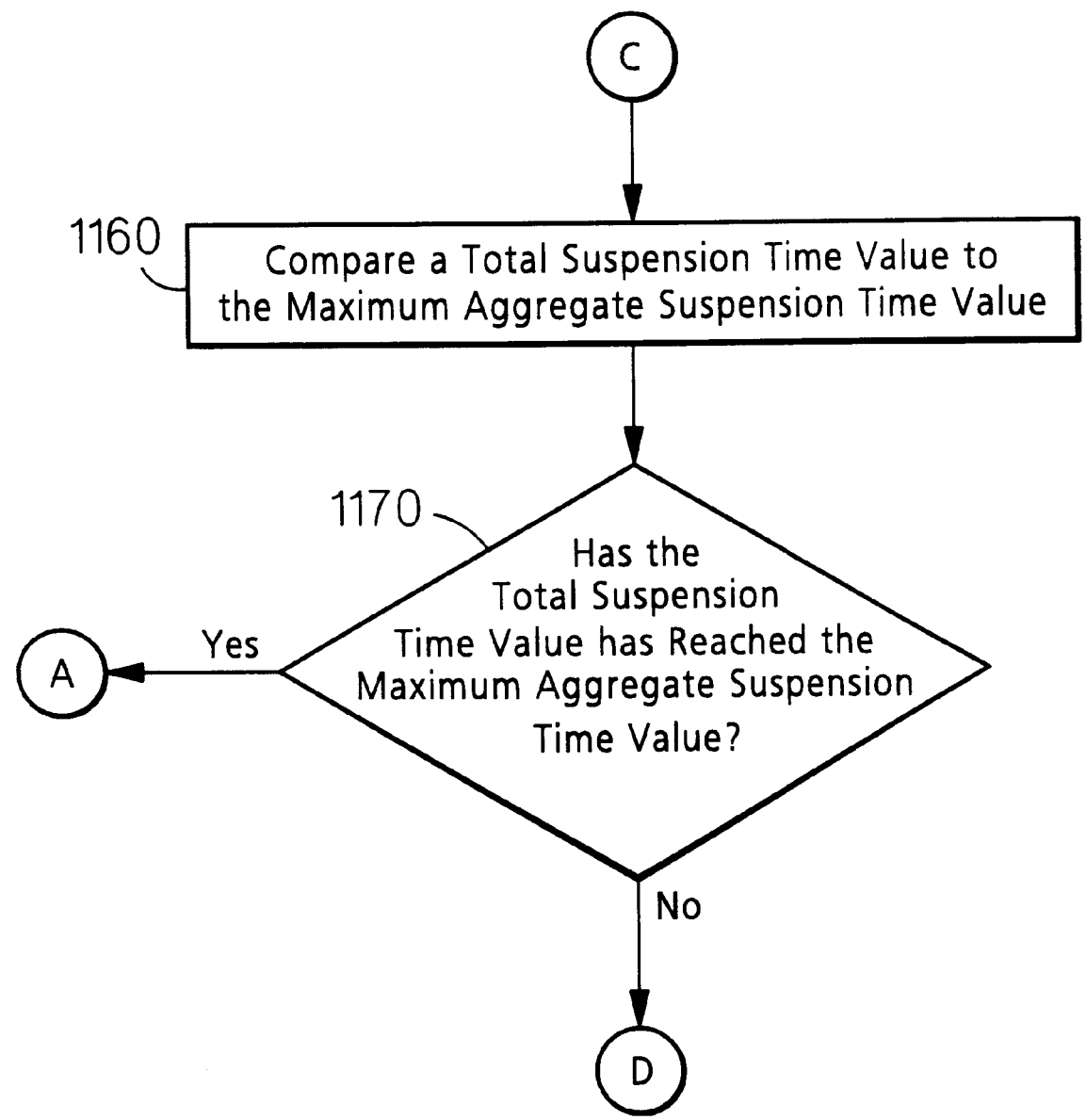
Figure 2D:
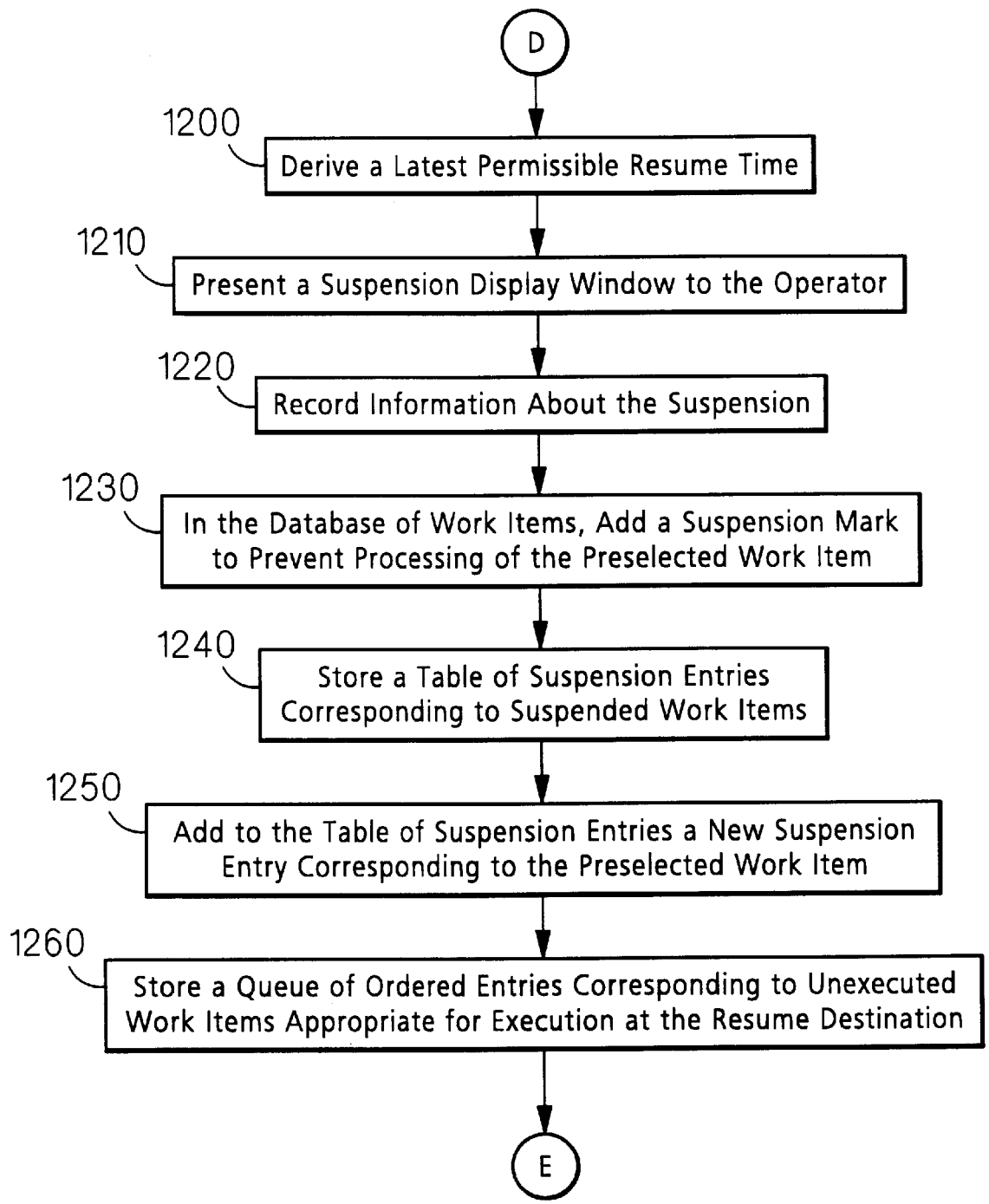
Figure 2E:
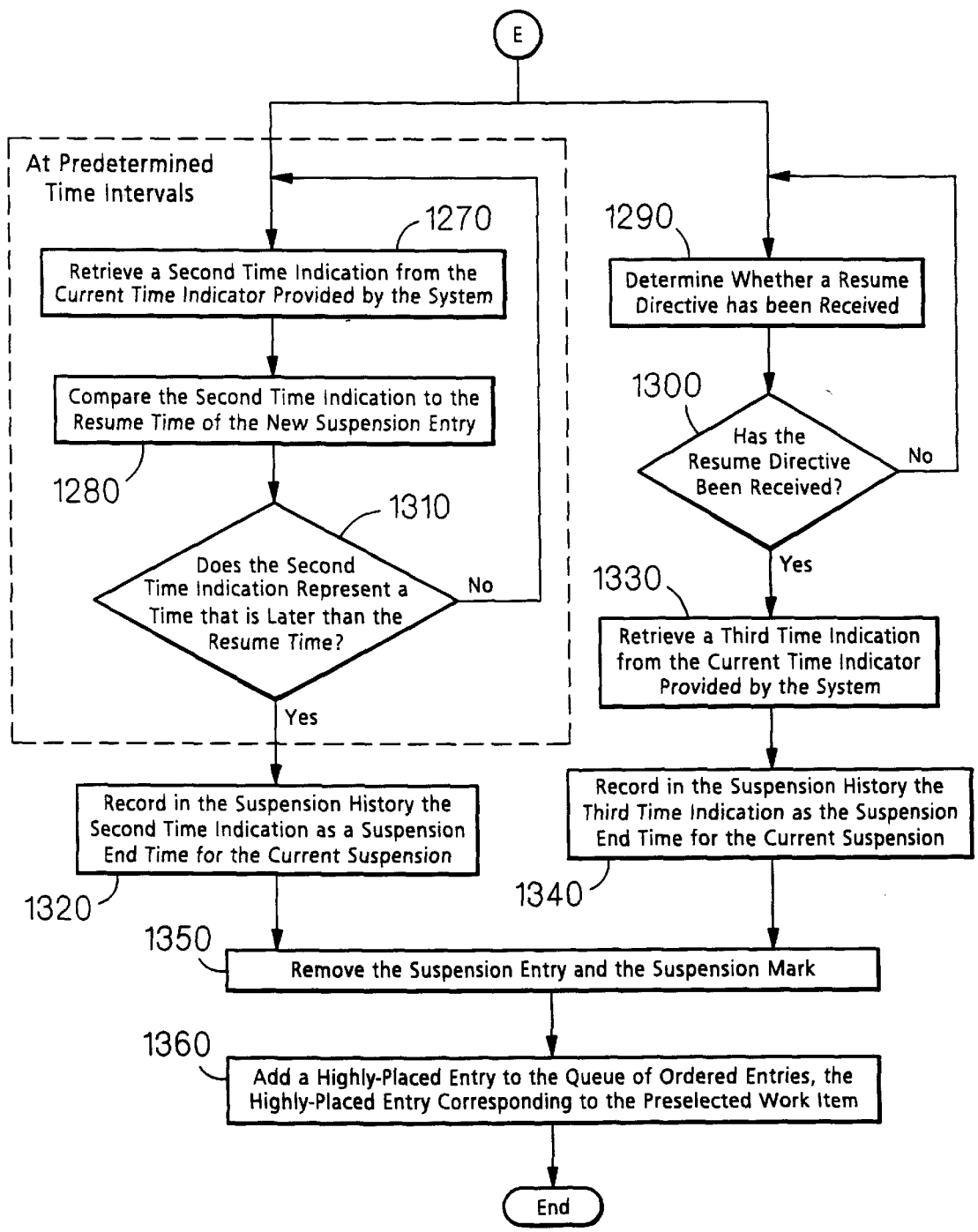

FIG. 1 illustrates an automated workflow system 15 that is based on a computer system 16 and that processes work items 10, 10A stored in a database 14 for subsequent execution by one or more operators at one or more computer stations 12, 12A. The computer system 16 and the computer stations 12, 12A are interconnected across a bidirectional data connection bus 18. The workflow system 15 facilitates the management of workflow as described by the Workflow Management Coalition in *Workflow Management Coalition Terminology & Glossary* Issue 2.0 (1996), incorporated by reference.

Figure 6:
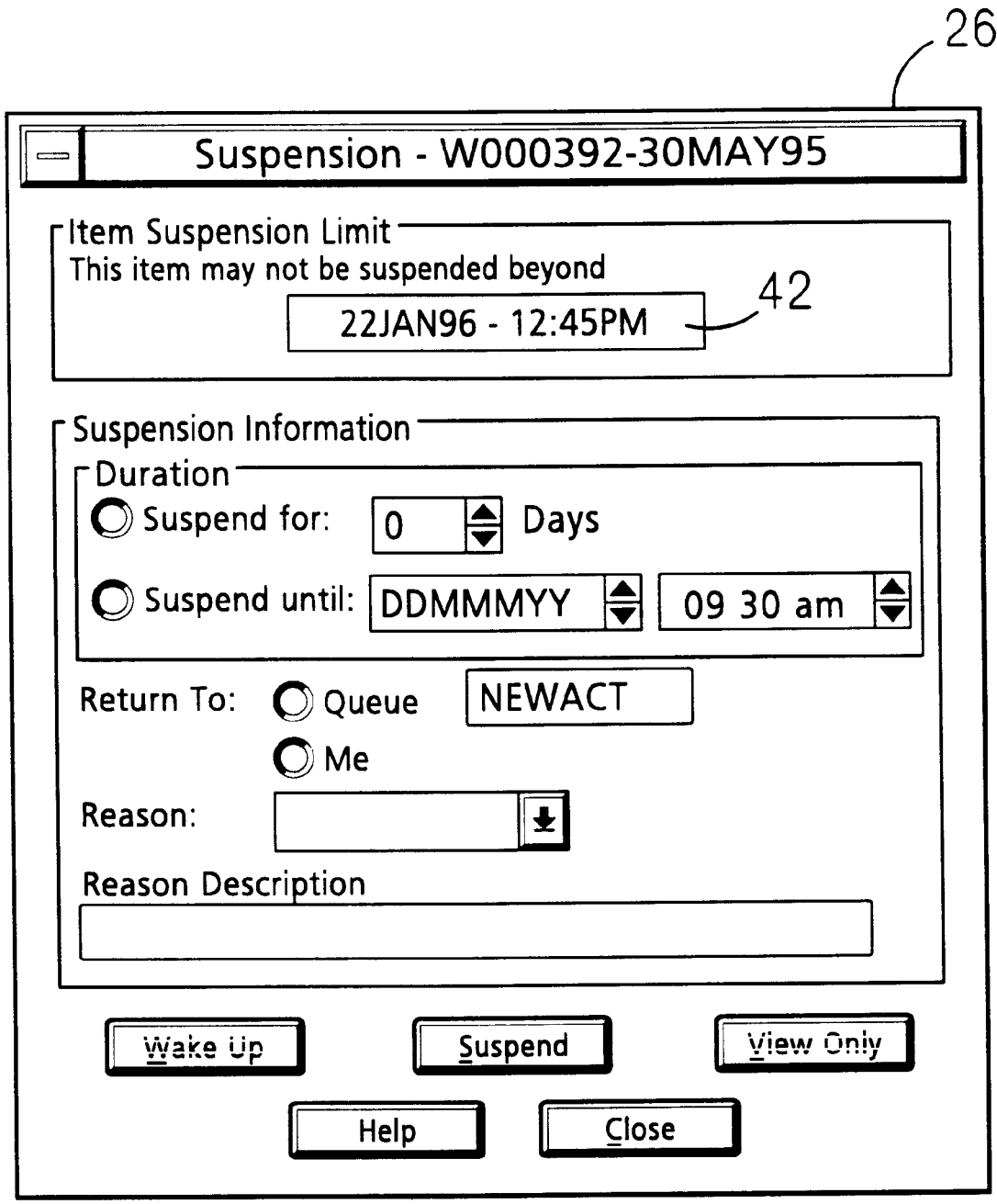
FIGS. 6, 14 are illustrations of display windows provided by the automated workflow system.
Figure 14:
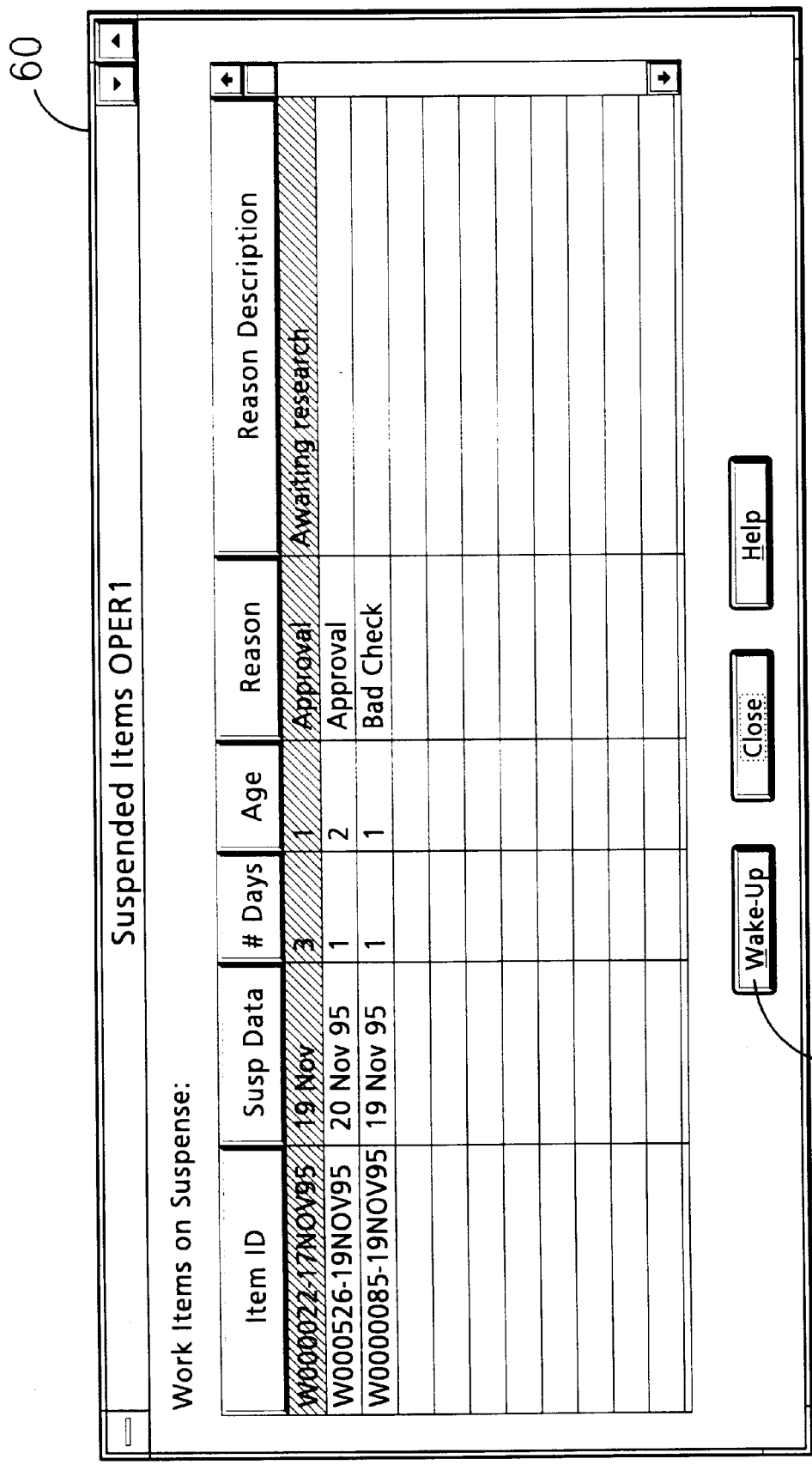

When an operator requests suspension of processing of one of the work items 10, the system 15 provides the operator with a display (such as display 26 of FIG. 6) indicating a maximum permissible duration for the suspension. The system 15 determines whether such suspension is permitted at the present time of day and whether the quantity of suspensions or total suspension time has reached a maximum permissible level. Based on the outcomes of these determinations, processing may be suspended as requested. If so, the suspension is marked in the database 14, and a suspension start time and a resume time are recorded. Subsequently, processing resumes at the resume time, or earlier if the same or a different operator selects the one of the work items 10 from a display list (such as display list 60 of FIG. 14) of suspended work items. At that point, a suspension end time is recorded, and the total suspension time is updated for use in a subsequent determination about whether processing may be suspended.

In particular, FIGS. 2A–2E illustrate a procedure executed by the workflow system 15. The procedure is used in processing a preselected one of the work items 10A to allow one of the operators at one of the computer stations 12A to delay execution of the preselected work item 10A. The database 14 is stored (step 1000) and includes for each work item (as shown in FIG. 3): an identifier (e.g, "123" 300 for preselected work item 10A), a type indicator (e.g., "28" 302 indicating that preselected work item 10A represents a new account application, as described below), work item data (e.g., new account application data 304), a phase status indicator (e.g., "3" 306 indicating that preselected work item 10A has not yet received new account application approval, as described below), and suspension mark, suspension quantity, and total suspension time fields (e.g., fields 308, 307, 309, respectively) for use as described below.

When the operator is ready to perform work (e.g., after the operator initially logs in to the computer system 16 from the computer station 12A or finishes working on another one of the work items 10), a request to provide the preselected work item 10A to the operator is received from the computer station 12A (step 1010). After a copy of the preselected work item 10A is provided to the computer station 12A in response (step 1020), the operator can execute or suspend processing of the preselected work item 10A, as described below.

Figure 4:
FIG. 4 is a block diagram of a time indicator of the automated workflow system.

Depending on predetermined authorization rules, the operator at the computer station 12A may be authorized to select a "Suspend" command from a pull-down menu. If the operator selects the "Suspend" command, a suspend directive is received (step 1030), representing a request for suspension of processing of the preselected work item 10A. From a current time indicator 22 (FIG. 4) provided by the system, a first time indication is retrieved (step 1040) for use with a time schedule 24 (described below), and represents a date and a time, such as Monday, Jan. 22, 1996, at 9:05 AM, as shown in FIG. 4.

Figure 5:

The time schedule 24 (FIG. 5) is stored to specify times when suspension is allowed and disallowed (step 1050). For example, suspension may be allowed from 9 AM to 3 PM on weekdays (as shown by lack of shading in FIG. 5), and may be disallowed during a 3–5 PM block of time on weekdays (as shown by shading in FIG. 5). Such disallowance during the 3–5 PM block may be specified as a result of an expectation that a significant event (e.g., the arrival and distribution of mail) will occur at that time. For instance, further processing of the preselected work item 10A— representing a new account application—may depend on receipt of a bank check by mail, which receipt would render unnecessary the delay due to suspension.

The first time indication is tested against the time schedule 24 (step 1060), and if the outcome of the test indicates that suspension is disallowed (step 1070), the workflow system 15 refuses to suspend processing of the preselected work item 10A (step 1080). Such is not the case, for example, if the first time indication represents Monday, Jan. 22, 1996, at 9:05 AM, as mentioned above.

Figure 7:
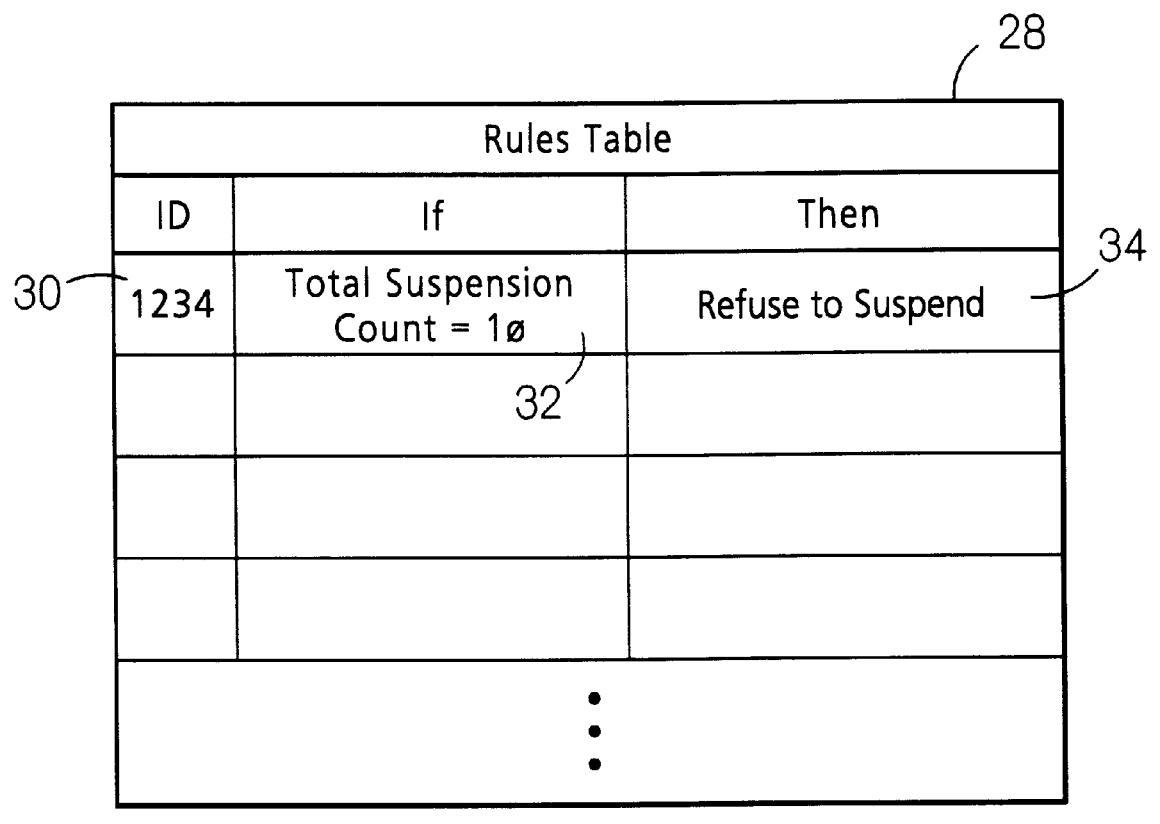

Whether suspension is allowed also depends on rules stored in a rules table 26 (FIG. 7) (step 1090), each rule having: a rule ID (e.g., "1234" 30), an "IF" section (e.g., "IF" section 32 specifying a maximum suspension count value of "10"), and a "THEN" section (e.g., "THEN" section 34 specifying refusal to suspend). The maximum suspension count value represents a maximum permissible number of suspensions for the preselected work item 10A.

Also specified in the rules table 26 are a maximum per-instance suspension time value and a maximum aggregate suspension time value representing a maximum suspension duration (e.g., two days) and a maximum permissible amount of aggregate suspension time, respectively, for the preselected work item 10A. For example, if the maximum aggregate suspension time value is "1480" (representing 480 minutes, i.e., 8 hours), processing of the preselected work item 10A may be suspended twice for four hours each time, or eight times for one hour each time, or a first time for 6 hours and then a second time for 2 hours, but not five times for 100 minutes each time.

Whether suspension is allowed also depends on the contents of the suspension quantity field 307 and total suspension time field 309 of the preselected work item 10A (step 1100). For the preselected work item 10A, the suspension quantity field 307 and the total suspension time field 309 maintain, respectively, a total suspension count and a total suspension time value representing a total number of times and an aggregate amount of time, respectively, that processing of the preselected work item 10A has been suspended.

In addition, a work history 36 (FIG. 8) for the preselected work item 10A describes details of significant events, including suspension start and end times (e.g., 10:08 AM on Tuesday, Jan. 2, 1996 and 3:12 PM on Wednesday, Jan. 3, 1996, respectively) for each of these previous instances of suspension.

For example, consistent with the work history 36 for the preselected work item 10A, the contents of the suspension quantity field 307 and the total suspension time field 309 may be "5" and "3387", respectively, representing 5 previous instances of suspension and 3387 minutes of aggregate suspension time, respectively. In the case of work history 36, the total suspension time value is "3387", because the suspensions recorded in the work history 36 had durations of 784, 610, 607, 603, and 783 minutes, respectively, according to the suspension start and end times. When the information is determined, a business hours schedule such as business hours schedule 40 (FIG. 10) is applied, allowing suspension time to be accumulated, e.g., only on weekdays from 9 AM to 5 PM (as indicated by a lack of shading in FIG. 10). As a result, the first suspension had a duration of 13 hours 4 minutes (i.e., 784 minutes), not 29 hours 4 minutes (i.e., 1744 minutes). The business hours schedule may be arranged in accordance with any unit of time, such as days, hours, minutes or seconds.

From the suspension quantity field 307 and total suspension time field 309, respectively, the total suspension count and the total suspension time value are retrieved (step 1110).

If a comparison to the maximum suspension count value (step 1120) indicates that the total suspension count has reached the maximum permissible number of suspensions (step 1130), the workflow system 15 refuses to suspend processing of the preselected work item 10A (step 1080). Such refusal does not occur in our example where the maximum suspension count value is "10" as specified in rule "1234" (FIG. 7) and the preselected work item 10A has a total suspension count of "5" from the suspension quantity field 307. Based on another comparison (step 1160), the workflow system 15 also refuses to suspend processing of the preselected work item 10A (step 1080) if the total suspension time value has reached the maximum aggregate suspension time value (step 1170).

If such refusal does not occur, a latest permissible resume time is derived from the first time indication, the maximum per-instance suspension time value, the total suspension time value, and the maximum aggregate suspension time value (step 1200). The operator is then presented with a display window, such as display window 26 (FIG. 6) that displays an item suspension limit string, such as item suspension limit string 42 ("Jan. 22, 1996-12:45 PM" in display window 26) representing the latest permissible resume time (step 1210).

For example, as described above, the first time indication may represent Monday, Jan. 22, 1996, at 9:05 AM, and the preselected work item 10A may have a total suspension time value of "3387", from the total suspension time field 309. If the maximum aggregate suspension time value is "3600", representing 3600 minutes (60 hours), processing of the preselected work item 10A may be suspended for up to 213 minutes (assuming the maximum per-instance suspension time value permits as much). As a result, in accordance with the business hours schedule and with rounding to the nearest quarter-hour, the latest permissible resume time is Monday, Jan. 22, 1996, at 12:45 PM, represented by item suspension limit string 42 ("Jan. 22, 1996-12:45 PM").

Figure 11:
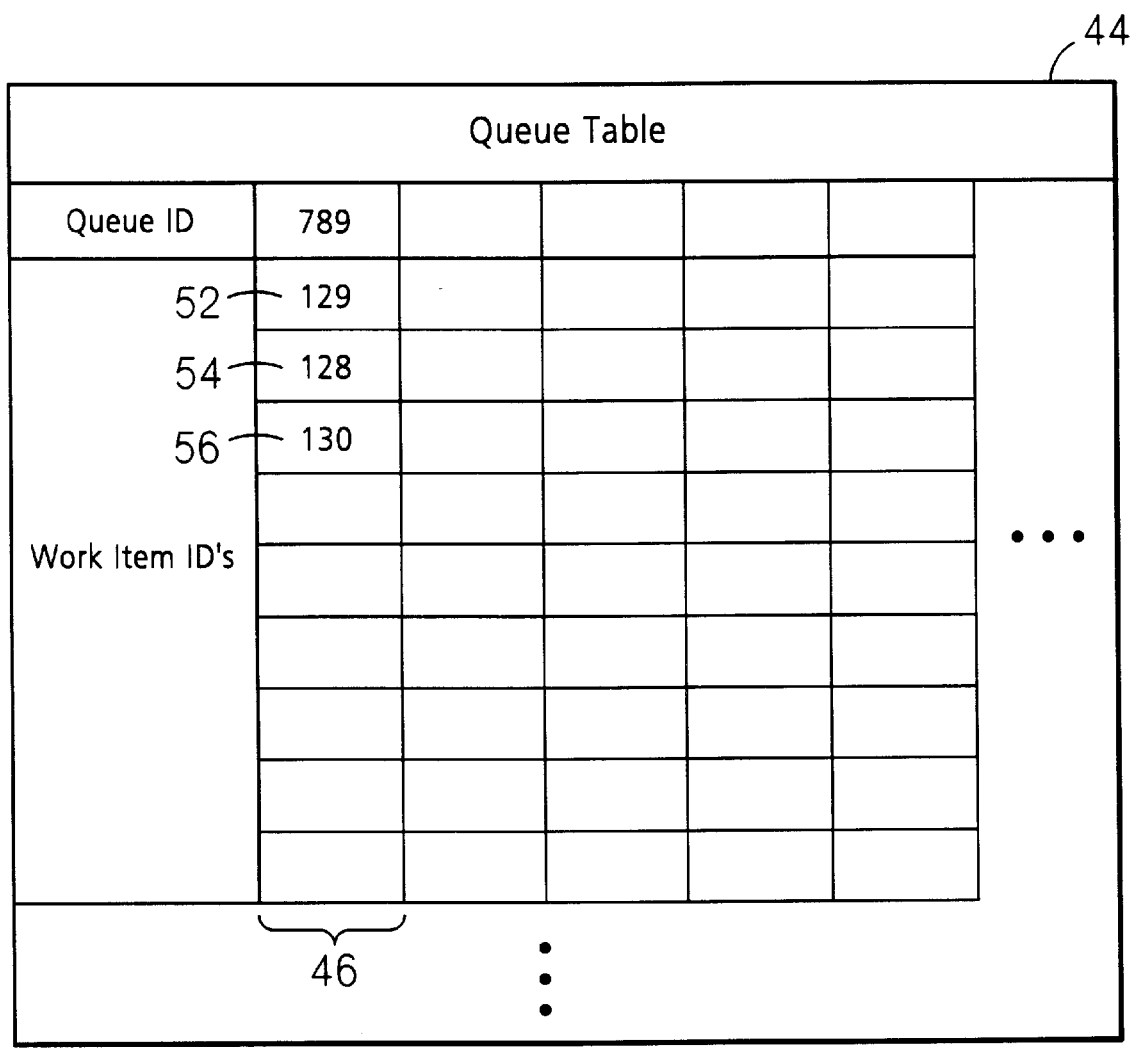

The display window allows the operator to select a resume time for the preselected work item 10A by specifying a number of days or a specific date and time for resumption of processing. Depending on the predetermined authorization rules, the display window may also allow the operator to select for the preselected work item 10A a resume destination to which another copy of the preselected work item 10A is to be provided when the preselected work item is made so available. Depending on the resume destination selected, the copy of the preselected work item 10A may be provided to the operator or to another operator in accordance with a queue such as queue "789" 46 of queue table 44 (FIG. 11), as described below. Lastly, the display window allows the operator to select a reason for the suspension. Where the preselected work item 10A represents a new account application, examples of such reasons include: waiting for an account number to be assigned, waiting for a check to be received, and waiting for a brochure to become available for enclosing with the report that the new account has been established.

After the resume time and destination and the reason are specified, in the work history the workflow system 15 records the first time indication as a suspension start time for the current suspension (step 1220).

At this time, processing of the preselected work item 10A is prevented, by adding a suspension mark to suspension mark field 308 in the database of work items 14 (FIG. 3) (step 1230). Also impacted is a table of suspension entries 48 that is stored by the workflow system 15 (FIG. 12) (step 1240) and in which the suspension entries correspond to suspended work items, i.e., work items for which processing has been suspended. A new suspension entry (e.g., suspension entry 50) is added to the table of suspension entries (step 1250) to identify the preselected work item 10A and the operator (based on an operator table such as operator table 52 (FIG. 13)), and to specify the resume time and the resume destination. In the case of suspension entry 50, the resume time is Monday, Jan. 22, 1996, at 12:45 PM, and the resume destination is the operator.

For subsequent use as described below, the workflow system 15 also stores a queue such as queue "789" 46 (FIG. 11) (step 1260). The queue has ordered entries (such as entries 52, 54, 56 of queue "789" 46) corresponding to unexecuted work items appropriate for execution by an operator at the resume destination. In the case of suspension entry 50, because the resume destination is the operator "OP1", the queue specifies unexecuted work items appropriate for execution by the operator "OP1".

At predetermined time intervals, such as every quarter-hour, a second time indication is retrieved from the current time indicator 22 provided by the system (step 1270) and is compared to the resume time of the new suspension entry (step 1280). Concurrently, it is determined whether a resume directive has been received for the preselected work item 10A from one of the computer stations 12 (step 1290).

The suspension end time for the preselected work item 10A is determined in one of two ways. If the second time indication represents a time that is later than the resume time (step 1310), the second time indication is recorded in the work history as the suspension end time for the preselected work item 10A (step 1300). On the other hand, if the resume directive has been received (step 1300), a third time indication is retrieved from the current time indicator 22 (step 1330) and is recorded in the work history as the suspension end time for the current suspension (step 1340).

For example, the operator may be presented with a suspended work items display window (e.g., suspended work items display window 60 (FIG. 14)) that presents a list derived from the table of suspension entries. The workflow system 15 may limit whether and how a particular suspended work item is represented in the list. For example, the list may have entries for only the suspended work items having a resume destination that corresponds to the operator or otherwise may prevent the operator from selecting a suspended work item having a resume destination not corresponding to the operator. To send a resume directive, the operator uses a pointing device such as a computer mouse to select a "wake-up" option represented by a "wake-up" button 62 after selecting one of the suspended work items represented in the list.

If the resume directive has been received or the second time indication represents a time that is later than the resume time, the suspension entry and the suspension mark are removed and the suspension quantity field 307 and total suspension time field 309 are updated (step 1350) and a highly-placed entry (corresponding to the preselected work item 10A) is added to the queue of ordered entries (step 1360). For example, the queue of ordered entries may be queue 46 (FIG. 11) arranged originally so that the operator will be provided with work item "129", followed by work item "128", and then work item "130". In such a case, the highly-placed entry is added so that the preselected work item 10A is provided to the operator before work item "129". At this point, the procedure terminates and may be repeated.

The procedure described above may be provided as one or more computer programs implemented using development software such as a Pyramid® C compiler program version 4.0 or a computer language such as Microsoft® Visual Basic® 3.0 or 4.0 or Microsoft® Visual C++®. The database 14 of work items 10 may be implemented using a database system such as an Oracle® Pyramid® database system version 7.2. The computer system 16 may include a computer such as a Pyramid® NILE™ computer having eight central processing units and two gigabytes of fast-access memory. An operating system such as Data Center Operating System ("DC-OSx") may run on the computer system 16. Each of the computer stations 12, 12A may be a personal computer running an operating system such as Microsoft® Windows® 3.1, Microsoft® Windows®95, or Microsoft® Windows® NT™. The bidirectional data connection bus 18 may be based on a network connection provided by a computer network using a TCP/IP protocol.

The technique (i.e., the procedure described above) may be implemented in hardware or software, or a combination of both. Preferably, the technique is implemented in computer programs executing on programmable computers (such as the Pyramid® NILE™ computer) that each include a processor, a storage medium readable by the processor (including volatile and non-volatile memory and/or storage elements), at least one input device such as a keyboard, and at least one output device. Program code is applied to data entered using the input device to perform the method described above and to generate output information. The output information is applied to one or more output devices such as the display screen 20 of the computer station 12A.

Each program is preferably implemented in a high level procedural or object-oriented programming language to communicate with a computer system. However, the programs can be implemented in assembly or machine language, if desired. In any case, the language may be a compiled or interpreted language.

Each such computer program is preferably stored on a storage medium or device (e.g., ROM or magnetic diskette) that is readable by a general or special purpose programmable computer for configuring and operating the computer when the storage medium or device is read by the computer to perform the procedures described in this document. The system may also be considered to be implemented as a computer-readable storage medium, configured with a computer program, where the storage medium so configured causes a computer to operate in a specific and predefined manner.

Other embodiments are within the scope of the following claims. For example, the determination as to whether suspension is permitted may be made at the time the preselected work item 10A is provided to the computer station 12A. In such a case, if it is determined that suspension of the preselected work item 10A is not permitted, the computer station 12A may make the pull-down menu's "Suspend" command unavailable to the operator.

Operator-based limits may also be placed on suspension. In such a case, the rules also specify a maximum operator suspension count value representing a maximum permissible number of suspensions of the preselected work item 10A by the operator, and an operator maximum aggregate suspension time value representing a maximum permissible amount of aggregate suspension time for the operator for the preselected work item 10A. And also maintained in the work item database 14 or determined from the work history 36 in such a case are an operator suspension count representing a number of times the operator has previously suspended processing of the preselected work item 10A, and an operator suspension time value representing an aggregate amount of time that processing of the preselected work item 10A has been suspended as a result of suspension by the operator.

By analyzing the work history after receiving the suspend directive, the workflow system 15 may derive and thus avoid maintaining one or more of the following: the total suspension count, the operator suspension count, the total suspension time value, and the operator suspension time value.

Whether suspension is allowed may depend on the contents of one or more other fields (such as a "status" field) of the preselected work item 10A, and these contents may be recorded in each work item's work history in connection with each instance of suspension. The preselected work item 10A may be processed according to a process 38 in which, e.g., the new account application is to be scanned into electronic form (phase 1), a new account is to be created (phase 2) and approved (phase 3) based on the new account application, and then establishment of the new account is to be reported (phase 4). In such a case, suspension may be allowed during the "scanning" phase but not during the "reporting" phase.

Figure 9:
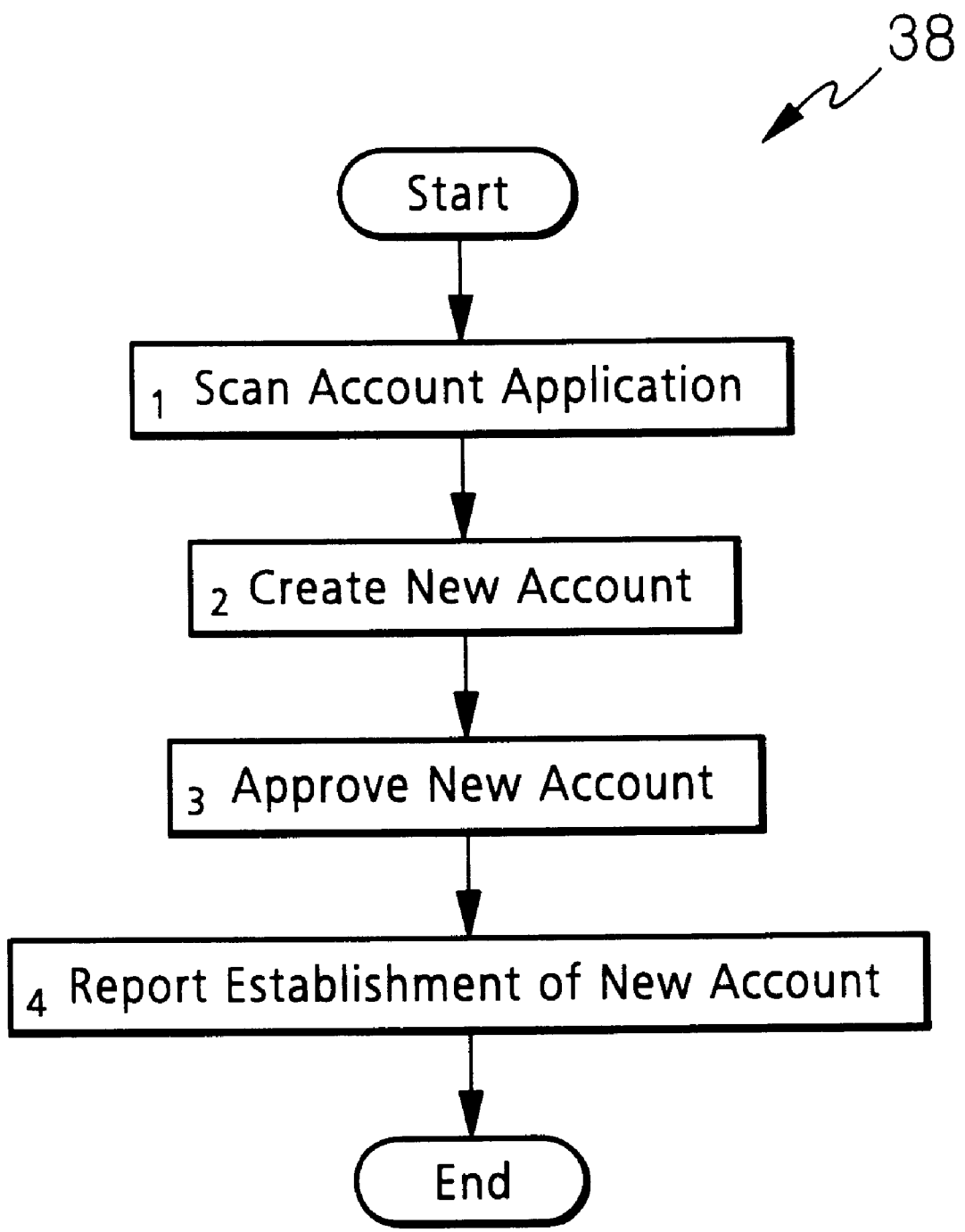

The work history may also be used as a basis for a statistic, e.g., derived with the use of business object reporting tools. For example, if process 38 (FIG. 9) is used for the preselected work item 10A and for other work items, the work history 36 and the work histories for the other work items may be used to determine a frequency with which suspension of processing occurs in connection with each phase in the process 38. For instance, based on the work history 36 in which five instances of suspension are recorded, suspension occurs in connection with the "approve new account" phase 60% of the time and in connection with operator "J. Smith" 60% of the time.

What is claimed is:

1. A computer-based method for use in processing a work item in an automated workflow system, the method comprising:
    storing suspension information relating to a previous suspension of the work item after the previous suspension has ended; and
    based on the suspension information, determining whether processing of the work item is permitted to be suspended.

2. The method of claim 1, wherein the determination is based on a limit specified by a rule.

3. The method of claim 1, further comprising:

based on the suspension information, determining a total number of times processing of the work item has been suspended.

4. The method of claim 1, further comprising:

based on the suspension information, determining a total amount of time processing of the work item has been suspended.

5. The method of claim 4, wherein the determination of the total amount of time is also based on a business hours schedule.

6. The method of claim 1, further comprising:

based on the suspension information, determining a number of times processing of the work item has been suspended as a result of an operator.

7. The method of claim 1, further comprising:

based on the suspension information, determining an amount of time processing of the work item has been suspended as a result of an operator.

8. The method of claim 7, wherein the determination of the amount of time is also based on a business hours schedule.

9. A computer-based method for use in processing a work item in an automated workflow system, the method comprising:

providing an indication of the current time; and based on the indication of the current time, determining whether processing of the work item is permitted to be suspended.

10. The method of claim 9, wherein the method further comprises storing a time schedule; and the determination is based on the time schedule.

11. A computer-based method for use in processing a work item in an automated workflow system, the method comprising:

after processing of the work item has been suspended, determining that processing of the work item is to be resumed; and altering an order in which the suspended work item would otherwise be presented to an operator by causing the work item to be one of a predetermined number of work items presented next to an operator after the determination is made.

12. The method of claim 11, wherein the predetermined number is one.

13. A computer-based method for use in processing a work item in an automated workflow system, the method comprising:

determining a recommended resume time; and displaying the recommended resume time to an operator before the operator causes processing of the work item to be suspended.

14. The method of claim 13, wherein the method further comprises determining a maximum suspension time value representing a maximum length of time for which processing of the work item is permitted to be suspended; and the determination of the recommended resume time is based on the maximum suspension time value.

15. The method of claim 13, wherein the method further comprises storing a business hours schedule for processing of the work item; and the determination of the recommended resume time is based on the business hours schedule for processing of the work item.

16. A computer-based method for use in processing a work item in an automated workflow system, the method comprising:

after processing of the work item has been suspended, determining whether an operator is authorized to cause processing of the work item to resume; and depending on the outcome of the determination, allowing the operator to cause processing of the work item to be resumed.

17. The method of claim 16, further comprising:

storing a suspended work items list comprising a suspended work item entry for each work item for which processing has been suspended; and displaying to the operator a display list of suspended work items, the display list including a selectable display entry for only each work item for which the operator is authorized to cause processing to resume.

18. A computer-based method for use in processing a work item in an automated workflow system, the method comprising:

storing information about a suspension of processing of the work item; and based on the information about the suspension, deriving a statistic about suspension of processing of work items in the automated workflow system.

19. The method of claim 18, wherein the method further comprises processing the work item in accordance with a predetermined sequence of phases; and the statistic represents a frequency with which suspension of processing of work items occurs in connection with one of the phases in the sequence.

20. The method of claim 18, wherein the statistic represents a frequency with which suspension of processing occurs for work items of a particular type.

21. The method of claim 18, wherein the statistic represents a frequency with which suspension of processing of work items occurs in connection with a particular operator.

22. A computer-based method for use in processing a preselected work item in an automated workflow system to allow an operator at a computer station to delay execution of the preselected work item, the method comprising:

receiving from the operator at the computer station a suspend directive requesting suspension of processing of the preselected work item;

refusing to suspend processing of the preselected work item if suspension is not allowed at the current time, a total suspension count has reached a maximum permissible number of suspensions, or a total suspension time value has reached a maximum aggregate suspension time value;

in the database of work items, adding a suspension mark to prevent processing of the preselected work item;

adding to a table of suspension entries a new suspension entry corresponding to the preselected work item, the new suspension entry specifying a resume time for when the preselected work item is to become available for processing again; and if a resume directive has been received or the current time is later than the resume time, removing the suspension entry and the suspension mark.

23. Computer software, residing on a computer-readable storage medium, comprising instructions for use in a computer system to use in processing a work item in an automated workflow system, the instructions causing the system to:

store suspension information relating to a previous suspension of the work item after the Previous suspension has ended; and based on the suspension information, determine whether processing of the work item is permitted to be suspended.

24. The computer software of claim 23, wherein the determination is based on a limit specified by a rule.

25. The computer software of claim 23, wherein the computer software further comprises instructions for causing the system to:

based on the suspension information, determine a total number of times processing of the work item has been suspended.

26. The computer software of claim 23, wherein the computer software further comprises instructions for causing the system to:

based on the suspension information, determine a total amount of time processing of the work item has been suspended.

27. The computer software of claim 26, wherein the determination of the total amount of time is also based on a business hours schedule.

28. The computer software of claim 23, wherein the computer software further comprises instructions for causing the system to:

based on the suspension information, determine a number of times processing of the work item has been suspended as a result of an operator.

29. The computer software of claim 23, wherein the computer software further comprises instructions for causing the system to:

based on the suspension information, determine an amount of time processing of the work item has been suspended as a result of an operator.

30. The computer software of claim 29, wherein the determination of the amount of time is also based on a business hours schedule.

31. Computer software, residing on a computer-readable storage medium, comprising instructions for use in a computer system to use in processing a work item in an automated workflow system, the instructions causing the system to:

provide an indication of the current time; and based on the indication of the current time, determine whether processing of the work item is permitted to be suspended.

32. The computer software of claim 31, wherein the computer software further comprises instructions for causing the system to store a time schedule; and the determination is based on the time schedule.

33. Computer software, residing on a computer-readable storage medium, comprising instructions for use in a computer system to use in processing a work item in an automated workflow system, the instructions causing the system to:

after processing of the work item has been suspended, determine that processing of the work item is to be resumed; and alter an order in which the suspended work item would otherwise be presented to an operator by causing the work item to be one of a predetermined number of next work items presented to an operator after the determination is made.

34. The computer software of claim 33, wherein the predetermined number is one.

35. Computer software, residing on a computer-readable storage medium, comprising instructions for use in a computer system to use in processing a work item in an automated workflow system, the instructions causing the system to:

determine a recommended resume time; and display the recommended resume time to an operator before the operator causes processing of the work item to be suspended.

36. The computer software of claim 35, wherein the computer software further comprises instructions for causing the system to determine a maximum suspension time value representing a maximum length of time for which processing of the work item is permitted to be suspended; and the determination of the recommended resume time is based on the maximum suspension time value.

37. The computer software of claim 35, wherein the computer software further comprises instructions for causing the system to store a business hours schedule for processing of the work item; and the determination of the recommended resume time is based on the business hours schedule for processing of the work item.

38. Computer software, residing on a computer-readable storage medium, comprising instructions for use in a computer system to use in processing a work item in an automated workflow system, the instructions causing the system to:

after processing of the work item has been suspended, determine whether an operator is authorized to cause processing of the work item to resume; and depending on the outcome of the determination, allow the operator to cause processing of the work item to be resumed.

39. The computer software of claim 38, wherein the computer software further comprises instructions for causing the system to:

store a suspended work items list comprising a suspended work item entry for each work item for which processing has been suspended; and display to the operator a display list of suspended work items, the display list including a selectable display entry for only each work item for which the operator is authorized to cause processing to resume.

40. Computer software, residing on a computer-readable storage medium, comprising instructions for use in a computer system to use in processing a work item in an automated workflow system, the instructions causing the system to:

store information about a suspension of processing of the work item; and based on the information about the suspension, derive a statistic about suspension of processing of work items in the automated workflow system.

41. The computer software of claim 40, wherein the computer software further comprises instructions for causing the system to process the work item in accordance with a predetermined sequence of phases; and the statistic represents a frequency with which suspension of processing of work items occurs in connection with one of the phases in the sequence.

42. The computer software of claim 40, wherein the statistic represents a frequency with which suspension of processing occurs for work items of a particular type.

43. The computer software of claim 40, wherein the statistic represents a frequency with which suspension of processing of work items occurs in connection with a particular operator.

44. Computer software, residing on a computer-readable storage medium, comprising instructions for use in a computer system to use in processing a preselected work item in an automated workflow system to allow an operator at a computer station to delay execution of the preselected work item, the instructions causing the system to:

receive from the operator at the computer station a suspend directive requesting suspension of processing of the preselected work item;

refuse to suspend processing of the preselected work item if suspension is not allowed at the current time, a total suspension count has reached a maximum permissible number of suspensions, or a total suspension time value has reached a maximum aggregate suspension time value;

in the database of work items, add a suspension mark to prevent processing of the preselected work item;

add to a table of suspension entries a new suspension entry corresponding to the preselected work item, the new suspension entry specifying a resume time for when the preselected work item is to become available for processing again; and if a resume directive has been received or the current time is later than the resume time, remove the suspension entry and the suspension mark.

45. The method of claim 1, further comprising receiving a request for suspension of the work item from an operator assigned to process the work item.

46. The method of claim 13, wherein the recommended resume time comprises a time that is permitted to be selected for when processing of the work item is to resume.

47. The computer software of claim 35, wherein the recommended resume time comprises a time that is permitted to be selected for when processing of the work item is to resume.

* * * * *

UNITED STATES PATENT AND TRADEMARK OFFICE
CERTIFICATE OF CORRECTION

PATENT NO. : 5,999,910
DATED : DECEMBER 7, 1999
INVENTOR(S) : KURT A. ROSENFELD ET AL.

It is certified that error appears in the above-identified patent and that said Letters Patent is hereby corrected as shown below:

Column 4, Line 47, delete "1480" and insert --480--.

Signed and Sealed this

Third Day of April, 2001

*Attest:*

NICHOLAS P. GODICI

*Attesting Officer*   *Acting Director of the United States Patent and Trademark Office*